United States Patent [19]

Formhals

[11] 4,252,198

[45] Feb. 24, 1981

[54] GROUND LEVELLING ATTACHMENT FOR TRACTORS

[76] Inventor: Gary G. Formhals, R.R. #1, Smithfield, Ill. 61477

[21] Appl. No.: 41,185

[22] Filed: May 21, 1979

[51] Int. Cl.³ .................. A01B 19/10; A01B 23/04; A01B 59/06; A01B 63/108

[52] U.S. Cl. ........................ 172/833; 172/501; 172/618; 172/712

[58] Field of Search .......... 172/276, 618, 501, 712, 172/777

[56] References Cited

U.S. PATENT DOCUMENTS

| | | | |
|---|---|---|---|
| 2,070,964 | 2/1937 | Scott et al. | 172/276 |
| 2,324,840 | 7/1943 | Hipple | 172/501 X |
| 2,631,513 | 3/1953 | Silver et al. | 172/501 X |
| 3,524,508 | 8/1970 | West | 172/501 X |
| 3,823,781 | 7/1974 | Check et al. | 172/501 X |
| 3,976,145 | 8/1976 | Blair | 172/618 X |

FOREIGN PATENT DOCUMENTS

507096  11/1954  Canada .................. 172/276

*Primary Examiner*—Paul E. Shapiro
*Attorney, Agent, or Firm*—Clarence A. O'Brien; Harvey B. Jacobson

[57] ABSTRACT

A support member for stationary support from a tractor forward of a ground wheel thereof and an elongated front to rear extending mount has its front end supported from the support member for pivotal movement of the mount between a predetermined rearwardly and downwardly inclined operative position with the rear end at an elevation lower than the support member and a raised inoperative position with the rear end elevated above the aforementioned operative position. An elongated inclined ground engaging and levelling member has its upper end oscillatably supported from the rear end of the mount for free oscillation relative to the mount between a first operative ground engaging limit position with the inclined member rearwardly and downwardly inclined and a second limit position with the inclined member similarly forwardly and downwardly inclined. Further, motor structure is provided for operative connection between the associated tractor and the mount for raising the latter from the operative position to the inoperative position thereof, the motor structure enjoying a one-way connection between the associated tractor and the mount whereby it is effective, only, to limit downward movement of the rear end of the support member toward its operative position.

7 Claims, 9 Drawing Figures

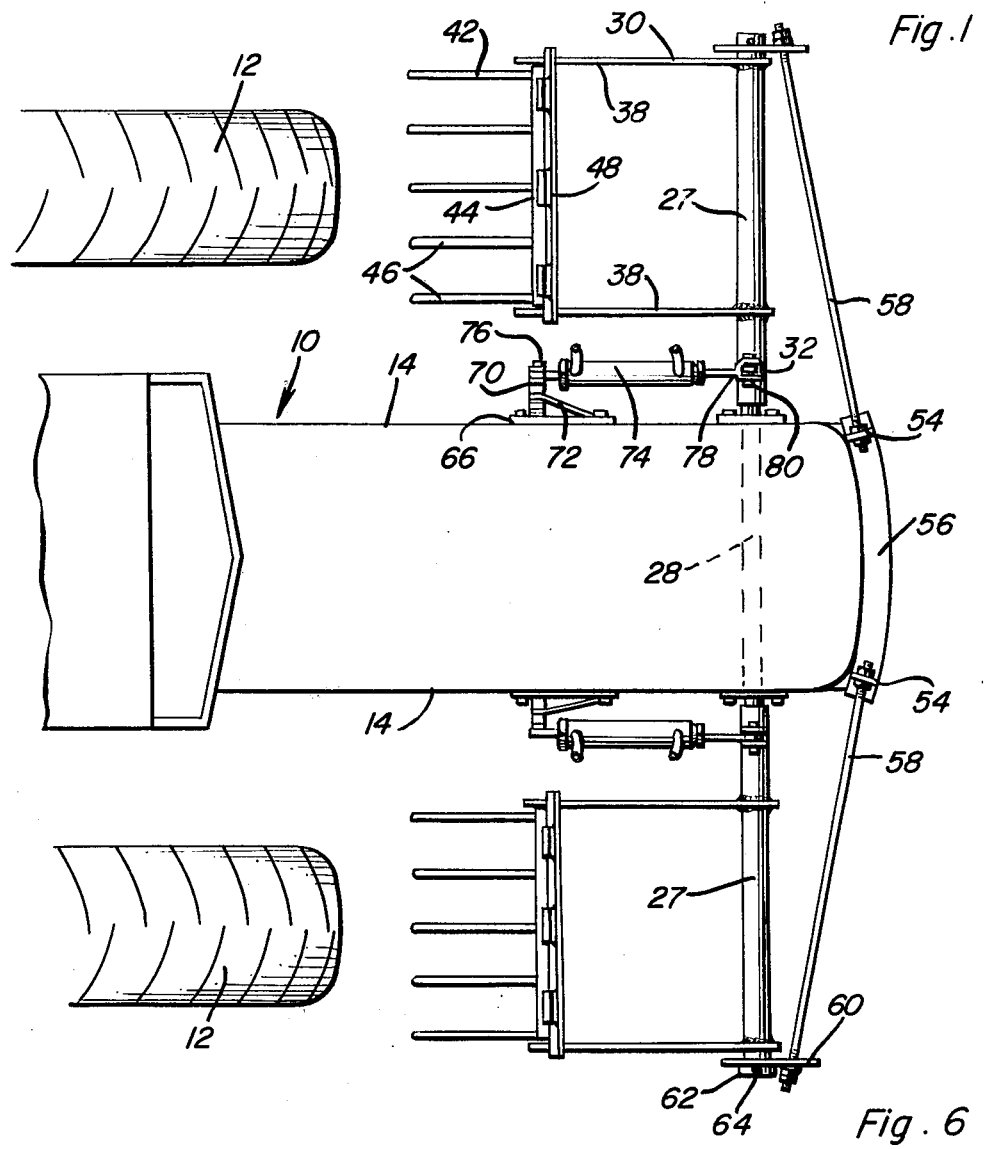
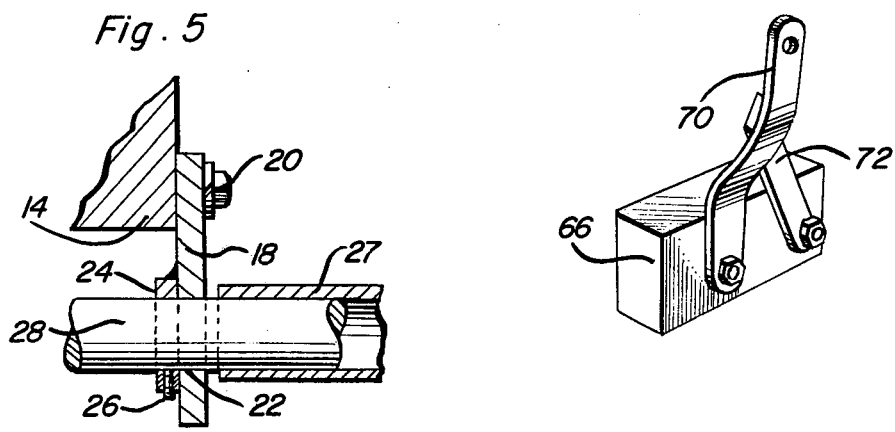

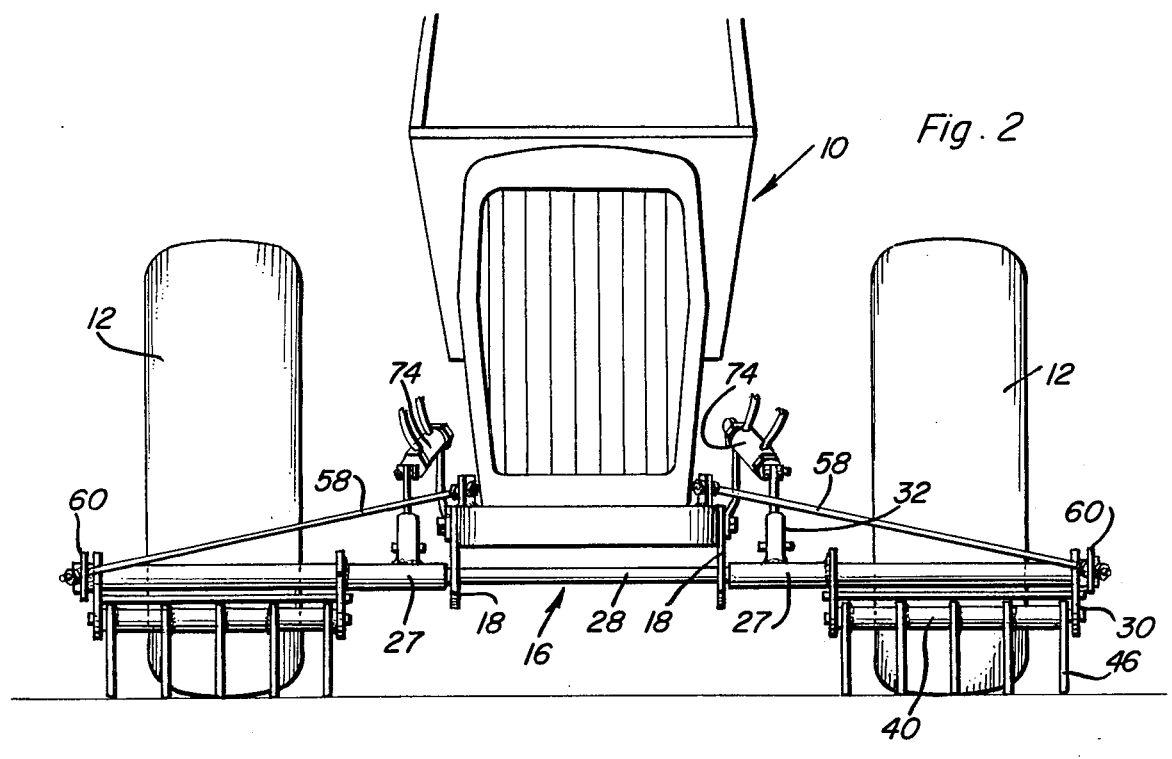
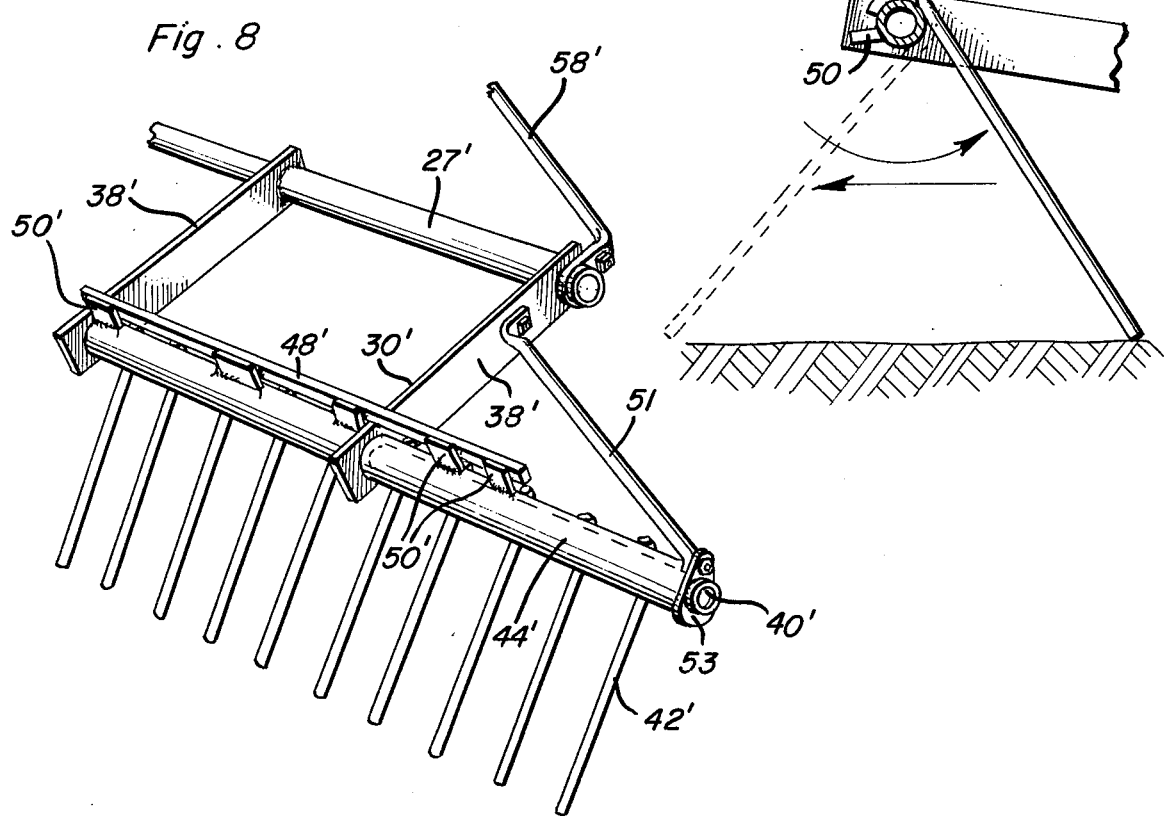

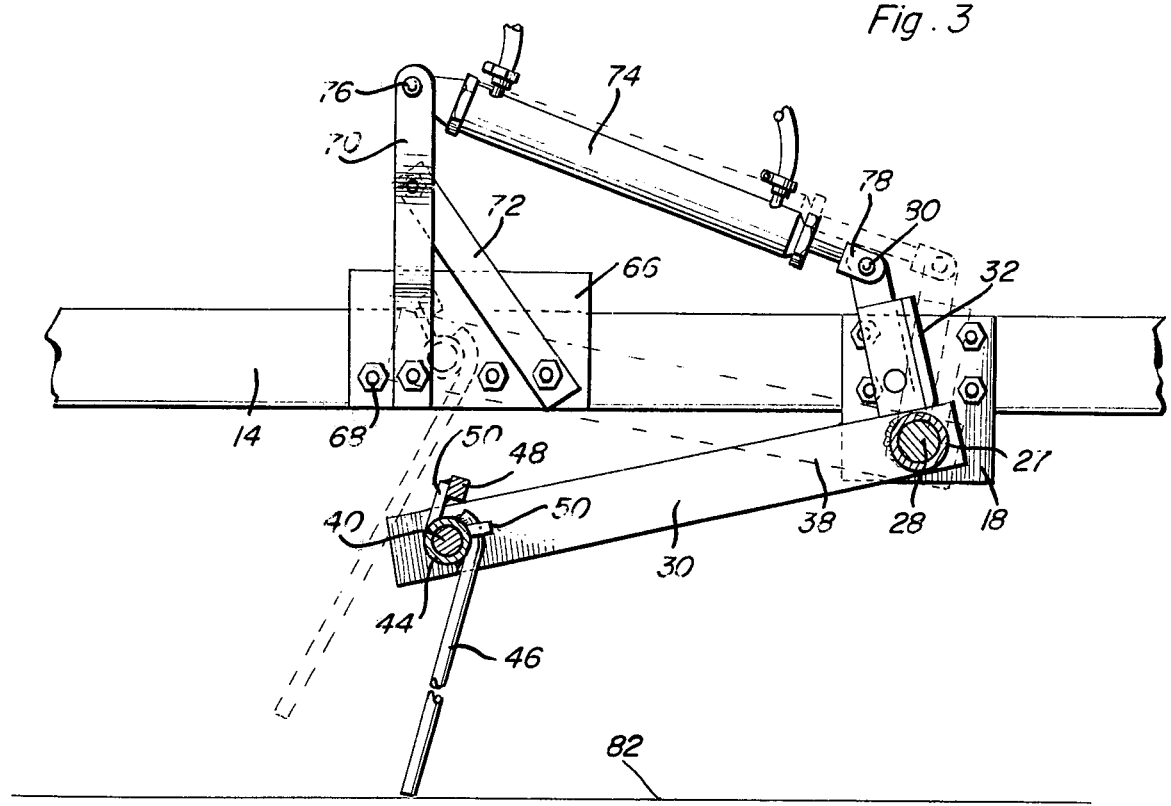
Fig. 3
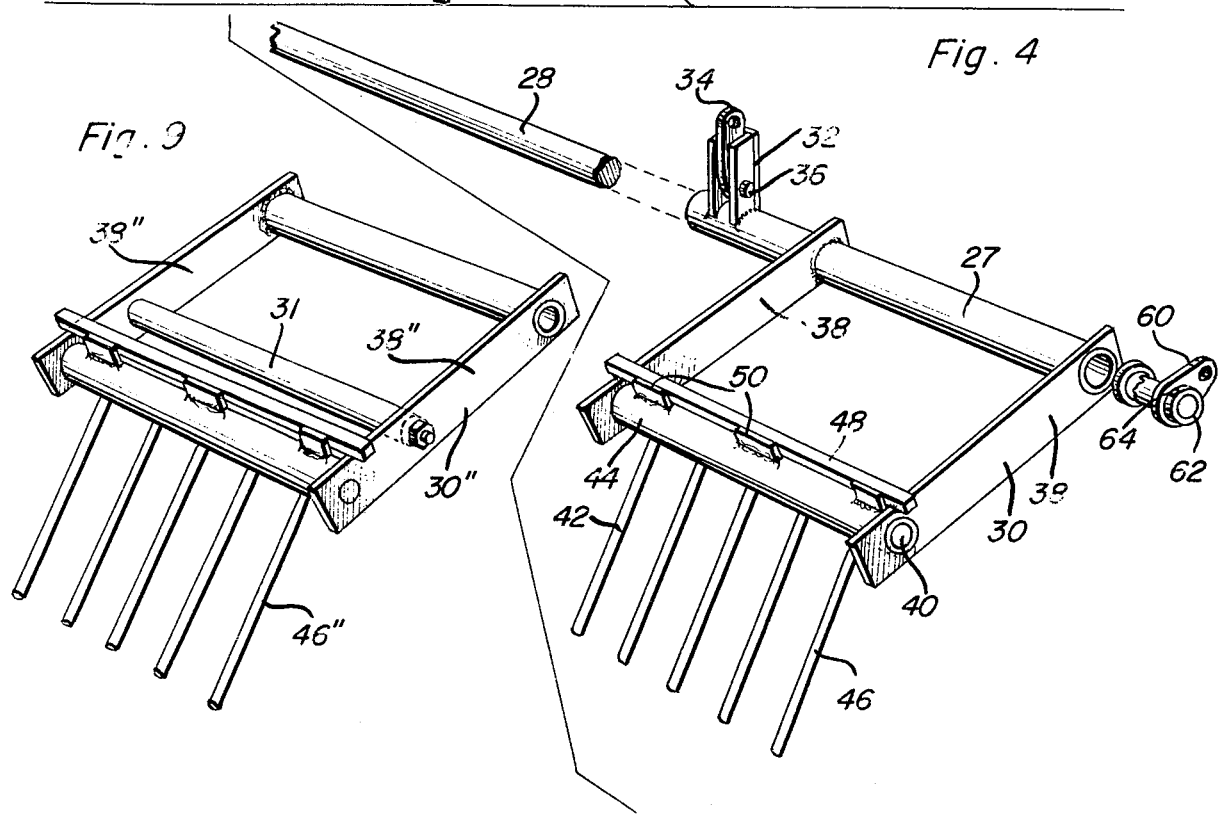
Fig. 4
Fig. 9

GROUND LEVELLING ATTACHMENT FOR TRACTORS

BACKGROUND OF THE INVENTION

When a tractor is being used to level down fall plowing or over rough ground on the first trip over a field in the spring, the rough ground causes the tractor to experience excessive oscillatory pitch movements resulting in uneven depth penetration of a ground working implement supported from the rear or trailed behind the tractor. Accordingly, a need exists for a ground levelling attachment whereby the ground immediately forwardly of the wheels of the tractor may be at least partially levelled and the tractor may experience less severe pitching movements. In addition, it is sometimes necessary to operate a tractor in a reverse direction. However, most ground levelling attachments heretofore known utilize elongated rearwardly and downwardly inclined ground engaging structure, thus preventing the tractor from moving in reverse, unless the ground levelling attachments are raised relative to their otherwise depressed operative positions. Although it may be a reasonably simple matter to actuate a ground levelling attachment elevating mechanism each time a tractor is to be operated in reverse, the necessity of having to operate an additional control is often bothersome. In addition, the need to raise a ground levelling attachment each time a tractor is to be operated in reverse, involves unnecessary actuation of the ground levelling attachment raising means. Therefore, a need also exists for a ground levelling attachment which need not be raised each time the associated tractor is to be operated in reverse.

Various forms of ground levelling attachments for tractors and other similar equipment are disclosed in U.S. Pat. Nos. 309,248, 1,744,801, 2,070,964, 2,269,983, 3,306,368 and 3,744,571. However, these previously known forms of ground levelling attachments and other structures are not constructed in a manner whereby they will be substantially wholly effective in levelling the ground forward of the associated tractor wheels and yet in a manner which may allow the associated tractor to be operated in reverse without effecting operation of a ground levelling attachment raising mechanism on the tractor.

The main object of this invention is to provide a ground levelling attachment for tractors which will be effective in levelling the ground forward of the wheels of a tractor.

Another important object of this invention is to provide a ground levelling attachment constructed in a manner whereby the associated tractor may be operated in reverse without the need to actuate a ground levelling attachment raising mechanism.

Still another object of this invention is to provide a tractor mounted ground levelling attachment including a free-floating and trailing ground levelling structure that may be readily weighted in order to compensate for different hardness soils.

Another object of this invention is to provide a ground levelling attachment which will be readily adaptable for support from different types of tractors.

A final object of this invention to be specifically enumerated herein is to provide a tractor ground levelling attachment which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a fragmentary top plan view of a conventional form of tractor with the ground levelling attachment of the instant invention mounted thereon;

FIG. 2 is a fragmentary front elevational view of the assemblage illustrated in FIG. 1;

FIG. 3 is an enlarged fragmentary longitudinal vertical sectional view taken substantially upon the plane passing through the transverse center of the right hand portion of the ground levelling attachment illustrated in FIG. 1;

FIG. 4 is a fragmentary exploded perspective view of the major portions of the right hand section of the ground levelling attachment;

FIG. 5 is an enlarged fragmentary vertical sectional view illustrating the manner in which the main support shaft of the attachment is supported from the associated tractor;

FIG. 6 is a perspective view of the rear lift cylinder mounting structure of the attachment;

FIG. 7 is a fragmentary longitudinal vertical sectional view of the ground working portion of the attachment illustrating the manner in which tines thereof may swing to forwardly and downwardly inclined position during reverse operation of the associated tractor;

FIG. 8 is a fragmentary perspective view of a laterally extended form of ground levelling attachment; and FIG. 9 is a fragmentary perspective view of an alternate weighted form of attachment.

DETAILED DESCRIPTION OF THE INVENTION

Referring now more specifically to the drawings, the numeral 10 generally designates a conventional form of farm tractor including front wheels 12. The tractor 10 includes opposite side frame portions 14 which project forwardly of the front wheels 12 and from which the ground levelling attachment of the instant invention is supported.

The ground levelling attachment is referred to in general by the reference numeral 16 and includes a pair of forward depending support plates 18 secured to the corresponding frame portions 14 by a plurality of bolts 20. The lower ends of the plates 18 project downwardly below the frame portions 14 and include aligned mounting bores 22 formed therethrough and also collars 24 welded thereto in alignment with the bores 22 and equipped with set screws 26. An elongated solid support member shaft 28 extends through the bores 22 and the collars 24 and is secured in position by the set screws 26.

The ends of the shaft 28 project outwardly beyond remote sides of the plates 18 and have the forward transverse tubular members 27 of elongated front to rear extending mounts 30 oscillatably mounted thereon. Each of the transverse member 27 includes an inner end from which a combined abutment and pivot mount 32 is supported and the lower end of an upstanding link 34 is pivotally anchored in the lower portion of each mount 32 as at 36.

The mounts 30 each comprise a pair of parallel laterally spaced apart rearwardly projecting arms 38 and the rear ends of each pair of arms are rigidly interconnected by a shaft 40 extending therebetween and welded thereto. Each mount 30 includes a rearwardly and downwardly inclined elongated ground engaging and levelling member 42 oscillatably supported from the corresponding shaft 40 and each member 42 includes a support sleeve 44 oscillatable on the corresponding shaft 40 and a plurality of laterally spaced and rearwardly and downwardly inclined tines 46 secured at their upper ends to the corresponding sleeve 44. An abutment bar 48 extends between and is secured to the rear ends of the arms 38 and the sleeve 44 includes two angularly displaced sets of abutment tabs 50 secured thereto at points spaced therealong and engageable with the abutment bar 48. The one set of tabs 50 is engageable with the rear side of the bar 48 above the sleeve 44 in order to limit upward swinging of the lower ends of the tines 46 when they are in rearwardly and downwardly inclined positions and the other set of tabs 50 are engageable with the front side of the bar 48 above the sleeve 44 to limit upward swinging movement of the lower ends of the tines 46 when they are in forwardly and downwardly inclined positions, such as those illustrated in FIG. 7 of the drawings.

A pair of right angle brackets 54 are supported from the forward cross member 56 of the tractor 10 and the inboard ends of a pair of tension rods 58 are secured through the brackets 54 while the outward ends of the tensions rods 58 are secured through plates 60 carried by the outboard ends of the shaft 28. The plates 60 have collars 62 welded to the outer sides thereof through which the terminal ends of the shaft 28 project. The collars 62 are equipped with set screws 64 engaged with the shaft ends.

A second pair of mounting plates or blocks 66 are also supported from the frame portions 14 by attaching bolts 68 and the plates or blocks 66 are spaced slightly rearwardly of the plates 18. Each plate or block 66 includes an upwardly projecting standard 70 supported therefrom and braced by means of an inclined brace 72 connected between the standard 70 and the corresponding block 66. The upper end of each standard 70 has one end of a double acting hydraulic cylinder 74 pivotally supported therefrom as at 76 and the other end of the double acting hydraulic cylinder includes a bifurcated terminal end 78 pivotally attached as at 80 to the upper end of the corresponding link 34. Accordingly, from FIG. 3 of the drawings, it may be seen that the hydraulic cylinder 74 may be extended to swing the links 34 into abutting engagement with the abutment and pivot mounts 32 in order to cause the rear ends of the mounts 30 to swing upwardly and to thus elevate the tines 46 above the ground 82 over which the tractor 10 is moving. Additionally, it will be observed from FIG. 3 of the drawings that when the hydraulic cylinders 74 are fully retracted in order to lower the rear ends of the mounts 30 downwardly toward the ground 82, should the lower ends of the tines 46 encounter heavy resistance during their engagement with the ground, the rear ends of the mounts 30 are free to swing upwardly. Thus, the hydraulic cylinders 74 merely limit the downward movement of the rear ends of the mounts 30, but do not prevent the rear ends of the mounts 30 from swinging upwardly in the event a large ground obstacle is encountered.

The tines 46 engage the ground 82 in a manner causing the ground ahead of the wheels 12 to be levelled. However, if the tractor 10 is to be operated in reverse, the lower ends of the tines 46 dig slightly into the ground 82 as the tractor 10 moves rearwardly and the rear ends of the mounts 30 swing upwardly until the tines 46 are vertically disposed. Thereafter, continued rearward movement of the tractor 10 causes the tines 46 to swing to the forwardly and downwardly inclined positions thereof illustrated in FIG. 7 of the drawings as the rear ends of the mounts 30 lower to their lower limit positions as defined by the abutment and pivot mounts 32 and the links 34 as positioned by the hydraulic cylinders 74.

With attention now invited more specifically to FIG. 8 of the drawings, there may be seen a modified form of mount referred to by the reference numeral 30' and which is substantially identical to the amount 30, except that the shaft 40' projects further outwardly than the shaft 40 and has a second rearwardly and downwardly inclined member 42' oscillatably supported from its outer extended end. Also, the abutment bar 48' is longer and the member 42' and the sleeve 44' includes sets of abutments 50' corresponding to the abutments 50. Further, an inclined brace 51 brace extends between and is secured to the outer side arm 38' corresponding to the outer side arm 38 and a plate 53, corresponding to the plate 60, carried by the outer extended end of the shaft 40'.

With reference now more specifically to FIG. 9 of the drawings, there may be seen a third form of mount referred to by the reference numberal 30" and which is substantially identical to the mount 30, except that a solid shaft 31 extends between and is secured to the longitudinal midportions of the arms 38" corresponding to the arms 38. The weight defining shafts 31, of course, cause the tines 46" to dig deeper into hard ground.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with a tractor including a rotatable ground wheel, a ground levelling attachment, said attachment including a support member stationarily supported from said tractor forward of said ground wheel thereof, an elongated front to rear extending mount having its front end supported from said support member for free pivotal movement of said mount between a predetermined rearwardly and downwardly inclined operative limit position with the rear end thereof at an elevation lower than said support member and a raised inoperative position with said rear end elevated above said operative position, and an elongated inclined ground engaging and levelling member having its upper end oscillatably supported from the rear end of said mount for free oscillation relative to said mount between a first limit position with said inclined member rearwardly and downwardly inclined and a second limit position with said inclined member similarly forwardly and downwardly inclined, said support member comprising an elongated transversely extending horizontal shaft, said front end of said mount including a horizontal transverse sleeve telescoped over and oscillatable on said horizontal shaft, said sleeve including an upstanding rearwardly opening channel member supported therefrom, an upstanding link pivotally mounted at its lower end within a lower portion of said channel member and including an upper end projecting upwardly above the upper end of said channel member, adjustment means operatively connected between said tractor and said link for selectively displacing the upper end of said link in front-to-rear direction relative to said tractor, said link, intermediate said upper and lower ends thereof being engageable with the inner side of the closed forward side of said channel member and comprising a one-way connection between said motor means and said channel member whereby downward inclination of said mount may be limited while allowing free upward inclination of said mount.

2. The combination of claim 1 wherein said ground engaging and levelling member includes longitudinally extending tines interconnected at their upper ends and having free lower ends for engagement with the ground.

3. The combination of claim 2 wherein said tines include a single set of tines mounted for simultaneous angular displacement relative to said mount.

4. The combination of claim 2 wherein said tines include multiple sets of tines with each set of tines being angularly displaceable in unison relative to said mount and each set of tines may oscillate relative to the mount independent of oscillation of the other tines relative to said mount.

5. The combination of claim 1 wherein said ground engaging and levelling member includes weight structure supported from the rear end portion thereof.

6. The combination of claim 1 wherein said shaft includes a transverse shaft for support from the associated tractor and including opposite end portions projecting outwardly of opposite sides said tractor, said attachment including a pair of mounts, each including a ground engaging and levelling member, oscillatably supported from the opposite end portions of said shaft.

7. The combination of claim 6 wherein said levelling attachment includes a pair of opposite side forwardly convergent bracing bars whose rearwardly diverging ends are anchored relative to the opposite ends of said shaft and whose forward convergent ends are adapted for anchoring to corresponding opposite side portions of said tractor.

* * * * *